United States Patent
Hegde et al.

(10) Patent No.: US 12,111,925 B1
(45) Date of Patent: *Oct. 8, 2024

(54) METHODS AND APPARATUS FOR DETECTING AND PREVENTING OBFUSCATED CYBERATTACKS USING MACHINE LEARNING TECHNIQUES

(71) Applicant: Google LLC, Mountain View, CA (US)

(72) Inventors: Vikram Hegde, Milpitas, CA (US); Chunsheng Victor Fang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,524

(22) Filed: Mar. 2, 2023

Related U.S. Application Data

(63) Continuation of application No. 16/582,265, filed on Sep. 25, 2019, now Pat. No. 11,620,379.

(60) Provisional application No. 62/739,283, filed on Sep. 30, 2018.

(51) Int. Cl.
| | |
|---|---|
| *G06F 21/55* | (2013.01) |
| *G06F 18/214* | (2023.01) |
| *G06F 18/24* | (2023.01) |
| *G06N 3/04* | (2023.01) |

(Continued)

(52) U.S. Cl.
CPC .......... *G06F 21/554* (2013.01); *G06F 18/214* (2023.01); *G06F 18/24* (2023.01); *G06N 3/04* (2013.01); *G06N 3/088* (2013.01); *G06N 20/00* (2019.01)

(58) Field of Classification Search
CPC .................................................... G06F 21/554
See application file for complete search history.

(56) References Cited

U.S. PATENT DOCUMENTS

| | | | |
|---|---|---|---|
| 9,479,518 B1 * | 10/2016 | Fang | .................. H04L 63/1425 |
| 10,521,587 B1 | 12/2019 | Agranonik et al. | |
| 10,986,103 B2 | 4/2021 | Hsuch et al. | |

(Continued)

OTHER PUBLICATIONS

Bohannon, "Invoke Obfuscation.", 2016, located at https:// https:// github.com/danielbohannonInvoke—Obfuscation, retrieved on Jun. 18, 2020, 3 pages.

(Continued)

*Primary Examiner* — Simon P Kanaan
(74) *Attorney, Agent, or Firm* — DORITY & MANNING P.A.

(57) ABSTRACT

The presently disclosed subject matter includes a system for monitoring a set of command lines or calls to executable scripts configured to be executed by an operating system. Each command line from the set of command lines is associated with an executable script configured to be executed by an operating system. The apparatus classifies, via a machine learning model, a command line from the set of command lines into an obfuscation category and prevents the operating system from executing the command line and generates a notification signal when the obfuscation category indicates that the command line is part of a cybersecurity attack. The apparatus allows the operating system to execute the command line or call to the executable script when the obfuscation category indicates that the command line is not part of a cybersecurity attack.

20 Claims, 7 Drawing Sheets

(51) Int. Cl.
  *G06N 3/088* (2023.01)
  *G06N 20/00* (2019.01)

(56) References Cited

U.S. PATENT DOCUMENTS

| 11,222,112 | B1* | 1/2022 | Satpathy | G06N 5/01 |
| 11,227,047 | B1* | 1/2022 | Vashisht | G06F 21/56 |
| 2017/0235848 | A1 | 8/2017 | Van Dusen et al. | |
| 2020/0159949 | A1 | 5/2020 | Burgess | |

OTHER PUBLICATIONS

Bohannon, "Invoke DOSfuscation.", 2018, https://i.blackhat.com/briefings/asia/2018/asia-18-bohannoninvoke-dosfuscation techniques_ for_fin _style_dos_level_cmd_obfuscation.pdf, Black Hat Asia, Mar. 20-23, 2018, 204 pages.

Bohannon, "DOSfuscation: Exploring the Depths of Cmd.exe Obfuscation and Detection Techniques.", 2018, Fire Eye, located at https://www.fireeye.com/blog/threat-research/2017 /06/obfuscation-inthe-wild.html, retrieved on Jun. 18, 2020, 2 total pages.

Bohannon et al., "Obfuscation in the Wild: Targeted Attackers Lead the Way in Evasion Techniques.", Jun. 30, 2017, https://www.fireeye.com/blog/threat-research/2017/06/obfuscation-in-the-wild.html, retrieved on 18, 2020, 2 pages.

Cruz, "Security 101: The Rise of Fileless Threats that Abuse Powershell.", Trend Micro, Security News, located at https://www.trendmicro.com/vinfo/us/security/news/securityechnology/security-101-the-rise-of-fileless-threats-that-abuse-powershell, retrieved on Jun. 18, 2020, 4 pages.

FastML, "What is Better: Gradient-Boosted Trees, or a Random Forest?" located at https://fastml.com/what-is-better-gradient-boosted-trees-or-random-forest/, retrieved on Jun. 18, 2020, 2 pages.

Puget, "Feature Engineering for Deep Learning.", 2017, Dzone, located at https://dzone.com/articles/feature-engineering-for-deep-learning, retrieved on Jun. 18, 2020, 2 pages.

Schiffman, "A Brief History of Malware Obfuscation: Part 1 of 2.", 2010, Cisco Blogs, 4 pages.

Wikipedia.com, "Cascade (computer virus).", 2018, located at https://en.wikipedia.org/wiki/Cascade(computer_virus), 1 page.

Xu et al.. "The Power of Obfuscation Techniques in Malicious JavaScript Code: A Measurement Study.", 2012 Seventh International Conference on Malicious and Unwanted Software, Oct. 16-18, 2012, Fajardo, Puerto Rico, 8 pages.

* cited by examiner (set[a-zA-Z0-9]+=.*&&)+(call set [a-zA-Z0-9]+=%[a-zA-Z0-9%]+%).*call%.*%
301 set env1=ec && set env2=ho && call set env3=%env1%%env2% && call %env3%
303 set env1=ec && set env2=ho^&^& call set env3=%env1%%env2% && call %env3%
305

FIG. 3

If COUNT ("set") >= 2 and COUNT("%") >= 4 and COUNT ("&") >= 4 and COUNT("call") >=2 then obfuscated
401

If length()>=20 and COUNT("&") >8 and MATCHES_REGEXP("(set[a-zA-Z0-9%]+=%[a-zA-Z0-9%]+=%[a-zA-Z0-9%]+%).*call%.*%").*call%.*%") then obfuscated
403

FIG. 4

METHODS AND APPARATUS FOR DETECTING AND PREVENTING OBFUSCATED CYBERATTACKS USING MACHINE LEARNING TECHNIQUES

RELATED APPLICATION

This application is a continuation of U.S. application Ser. No. 16/582,265, filed Sep. 25, 2019, which claims priority to U.S. Provisional Application No. 62/739,283, filed on Sep. 30, 2018, each entitled "Methods and Apparatus for Detecting and Preventing Obfuscated Cyberattacks Using Machine Learning Techniques", the disclosure of each of which is incorporated herein by reference in its entirety.

TECHNICAL FIELD

The present disclosure relates generally to the detection of cyberattacks and more specifically to systems to detect post-breach lateral cyberattacks.

BACKGROUND

With the increased focus by defenders on the download of software from external command and control servers, attackers have increasingly adopted the approach of using utilities built into conventional and widely used operating systems for parts of the infection workflow instead of writing custom code that can be more easily detected. This process has been accelerated with the release of new tools to generate benign obfuscated utility invocation.

Thus, a need exists for systems that can detect and impede the execution of malware (malicious software) deployed and concealed via obfuscation techniques.

SUMMARY

In at least one embodiment, described herein, addresses the need for systems to detect post-breach cyberattacks with a system for monitoring a set of command lines or calls to executable scripts configured to be executed by an operating system. Each command line from the set of command lines is associated with an executable script configured to be executed by an operating system. The apparatus classifies, via a machine learning model, a command line from the set of command lines into an obfuscation category and prevents the operating system from executing the command line and generates a notification signal when the obfuscation category indicates that the command line is part of a cybersecurity attack. The apparatus allows the operating system to execute the command line or call to the executable script when the obfuscation category indicates that the command line is not part of a cybersecurity attack.

BRIEF DESCRIPTION OF THE FIGURES

FIG. 3 illustrates instances of regular expressions configured to identify obfuscated command lines, according to an embodiment.

FIG. 4 illustrates examples of IF-THEN rules in combination with regular expressions configured to identify obfuscated command lines, according to an embodiment.

DETAILED DESCRIPTION

Figure 1:
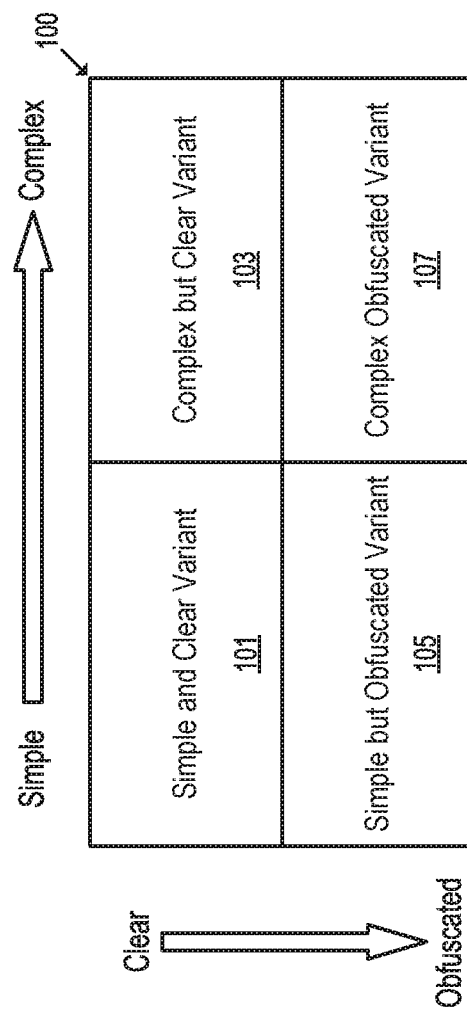
FIG. 1 is a diagram with an example of dimensions of obfuscation, according to an embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

The use of obfuscation has a long history in malware. From the encryption of malicious payloads (starting with the "Cascade" virus), obfuscation of strings, to JavaScript™ obfuscation. The purpose, no matter where in the infection process it is used, has been twofold—to first make it hard to find patterns in executable code, strings or scripts that can be easily detected by defensive software, and second make it much harder for reverse-engineers and analysts to decipher and fully understand the processes and functions of malware.

Skilled attackers continually seek out new attack methods, while employing evasion techniques to maintain the effectiveness of old methods, in an ever-changing defensive landscape. Many of these attackers employ obfuscation frameworks for common scripting languages such as JavaScript™ and PowerShell™ to thwart signature-based detections of common offensive tradecraft written in these languages.

Although, defenders' visibility into these popular scripting languages can increase through better logging and defensive tooling, some stealthy attackers have shifted their approach to languages that do not support this additional visibility. At a minimum, determined attackers are adding minimal amounts of simple obfuscation to previously detected payloads and commands to break rigid detection rules.

Valuable data and documents stored in or otherwise accessible by individual endpoints or other compute devices contain information often targeted by attackers for corruption, transformation, and/or extraction. For convenience in description, the compute devices will be referred to as endpoints. To manipulate this information attackers often attempt to insert and process malware on the endpoint with accessible target data. Endpoint cybersecurity software running on the endpoint presents a challenging environment for attackers attempting to run malicious software on the endpoints or because the cybersecurity software can detect malware and can block its processing. To mask their malicious efforts, the attackers can deliver facially-benign malware (for example, scripts) to the endpoints to avoid detection by the cybersecurity software. After those scripts are resident on the endpoints, they can generate malicious content, during execution. The facially-benign script is often executed through an operating system command line, using code that is obfuscated to prevent determination of maliciousness by cybersecurity software. For example, in a multi-stage attack, a facially benign, yet obfuscated executable script, may be executed by the shell (command line interpreter) and operating system in response to a command line and/or a user action (e.g., clicking on a macro in a Microsoft Word® document), and the executable script may generate a hidden call to download additional malicious content, and/or extract information via the network connection. Consequently, an obfuscated executable script exposes a significant attack surface.

Figure 2:
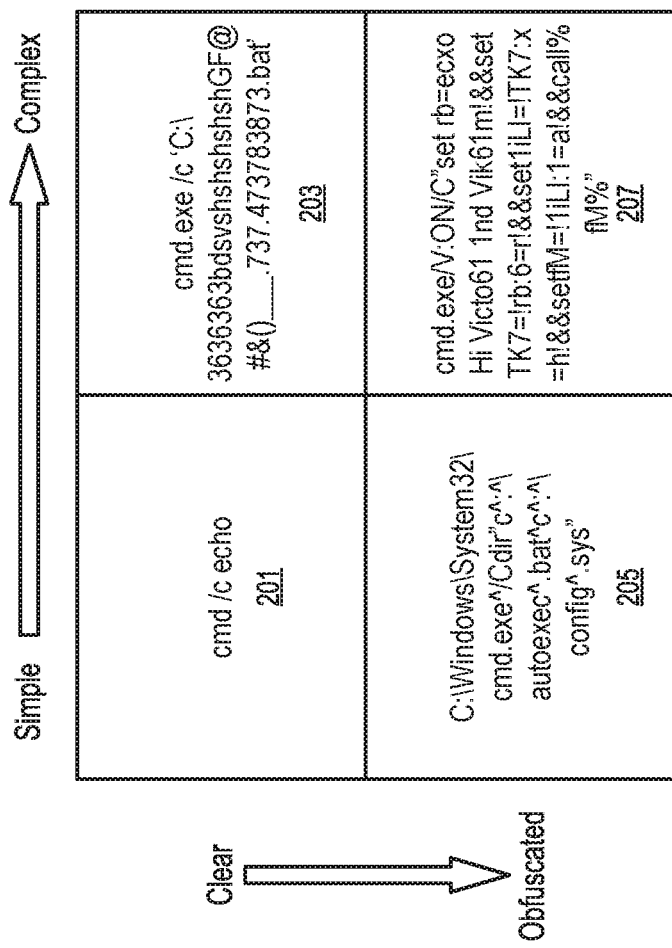
FIG. 2 illustrates instances of obfuscated, and non-obfuscated command lines or calls for executable scripts belonging to different command line obfuscation variants, according to an embodiment.

Some examples of obfuscated command variants are discussed with respect to FIG. 1 and FIG. 2. FIG. 1 illustrates obfuscation dimensions of command lines variants. The grid 100 has two axes: the horizontal axis ranges from simple to complex command lines variants, while the vertical axis ranges from clear to obfuscated command lines variants. A simple but obfuscated command line variant 105 can refer to a short and relatively uncomplicated but still obfuscated command line. A complex obfuscated command line variant 107 can refer to long, highly complex obfuscated command line. A simple and clear command line variant 101 can refer to short, simple structured, and readily comprehensible command line. A complex but clear command line variant 103 can refer to long and complex command lines, however, such command lines are in clear text and thus, comprehensible.

Examples of the command line variants discussed with reference to FIG. 1 are shown in FIG. 2. A simple and clear command line variant is shown at 201. A complex but clear command line variant is shown at 203. A simple but obfuscated command line variant is shown at 205. A complex obfuscated variant is shown at 207.

Existing techniques to detect obfuscation (such the examples shown in FIG. 1 and FIG. 2) can be divided into three categories. One category includes writing a large number of complex regular expressions to match the most commonly used syntax of a command line interface. An example of such regular expressions is shown in FIG. 3 at 301. There are two problems with this approach. First, it is not possible to develop regular expressions to cover every abuse of the command line, i.e., to cover every possible obfuscated command line variant. Second, even if a particular pattern of abuse (for example, building a new command line in environment variables, concatenating such new command line and then calling such new command line as shown at 303) can be covered by a regular expression intended to (or configured to) detect that particular pattern of abuse, the regular expression can be circumvented by attackers. For instance, a determined attacker can produce obfuscated text that uses the very same pattern shown at 303 and still escape detection. For example, the command line at 305 uses the "concatenation" pattern with just two extra carets that circumvents the regular expression shown at 303.

A different known technique to detect obfuscated command lines includes producing IF-THEN rules as shown in FIG. 4. Hardcoding IF-THEN rules such the ones shown at 401 and 403 are hard to generate, complex to verify, and difficult to maintain because the obfuscation techniques used by attackers evolve over time to escape detection of implemented rules such the ones shown in FIG. 4. Specifically, the IF-THEN rule shown at 401 is hardcoded, that is, it targets a specific type of obfuscated command line. In contrast, the IF-THEN rule shown at 403 combines regular expressions enabling it to detect more than one specific type of obfuscated command line. That said, as discussed above, the use of regular expressions even included in IF-THEN rules are not efficient enough to keep up with the development of new malware.

A machine learning approach discussed below overcomes the limitations of the prior art techniques to detect obfuscated command lines described above with reference to FIG. 3 and FIG. 4. Machine learning techniques often include feeding data to machine learning logic and developing, what is called, a model, which is essentially a mapping from input to output (approximation of an underlying function). This process of developing a model is called training. The trained model is then applied to different input data for which the output data is desired. In the specific sub-case of machine learning called supervised learning, the input is "labelled," i.e., the data supplied to the machine learning logic during "training" includes both input and output pairs, giving the logic direct feedback on what the correct output is during training. Some machine learning techniques that may be used in embodiments of the invention can work with any kind of raw data (if numeric)—neural networks are a prime example. Most other machine learning approaches, however, currently involve a human cyber-security analyst to extract pertinent information (called "features") from raw data before the extracted features are fed into the machine learning logic. Accordingly, it is contemplated that some embodiments described herein can extract features via an automated (computerized) approach, by a cyber-security analyst or by a combination of automation and analyst (for example, where the cybersecurity analyst trains an automated feature extractor and/or verifies its results). Although the above discussion relates to supervised machine learning, it should be understood that unsupervised machine learning and semi-supervised machine learning can also be used in at least some of the embodiments discussed herein instead or in combination with supervised machine learning.

Figure 5:
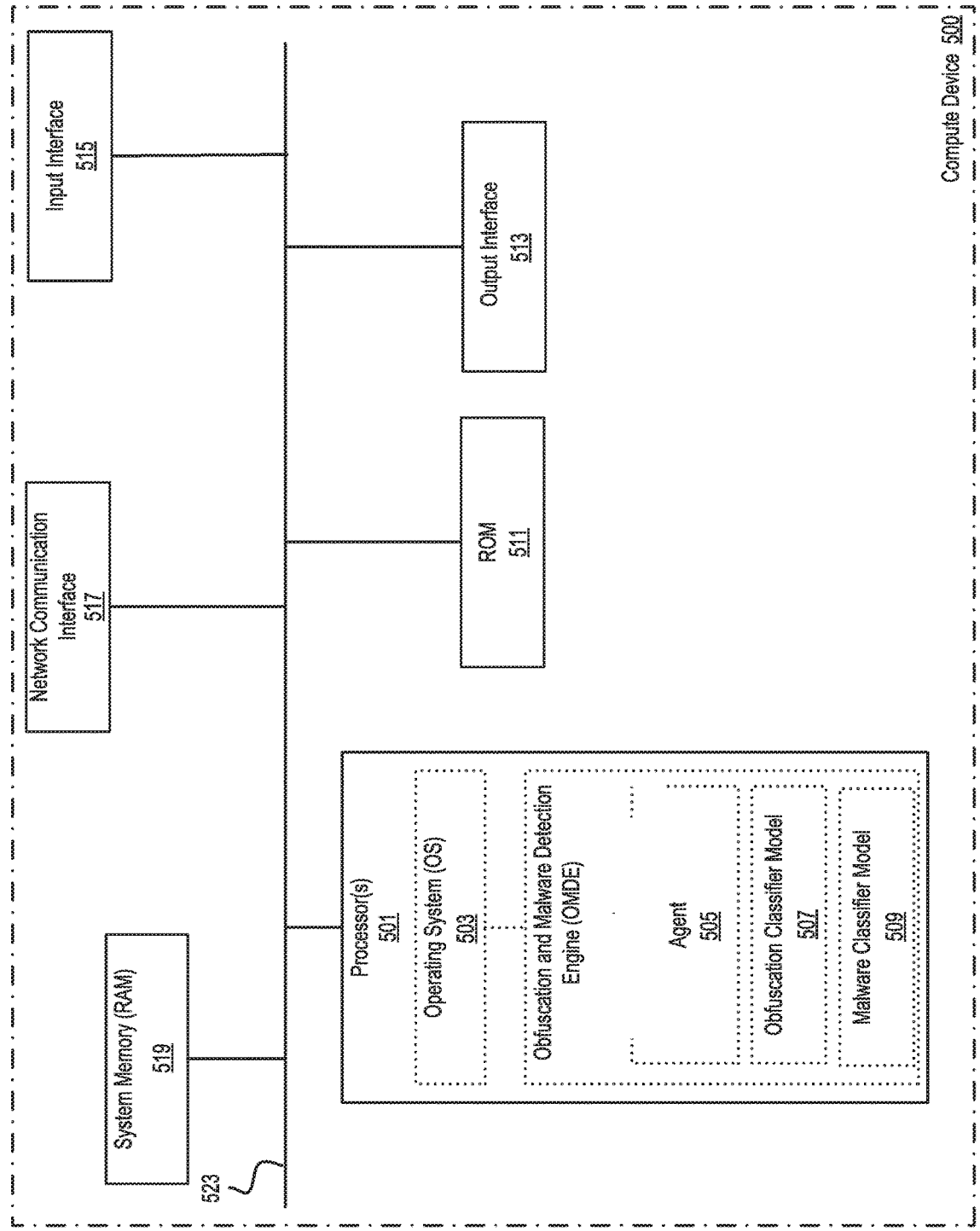
FIG. 5 is block diagram illustrating an apparatus to detect and impede the execution of obfuscated malware, according to an embodiment.

An implementation to detect and intercept obfuscated malware is discussed with reference to FIG. 5. FIG. 5 conceptually illustrates an endpoint or other compute device 500 with which some embodiments of the subject technology can be implemented. The compute device 500 can be, for example, a user-operated computer, Network Attached Storage (NAS), smartphone, tablet, notepad, industrial controller, and/or any other suitable electronic device or appliance. Such a compute device 500 includes various types of processor-readable media and interfaces. Compute device 500 includes a bus 523, a processor 501, a system memory or Random Access Memory (RAM) 519, a read-only memory (ROM) 511, an Input Interface 515, an Output Interface 513, and a Network Communication Interface 517.

The bus 523 represents collectively, system, peripheral, and/or chipset buses that communicatively connect the numerous internal devices of the compute device 500. For instance, the bus 523 communicatively connects the processor 501 with the read-only memory (ROM) 511, the system memory (RAM) 519, the Output Interface 513, the Input Interface 515, and the Network Communication Interface 517.

The Input Interface 515 enables users to communicate information and select commands at the compute device 500. For example, the Input Interface 515 allows a user to run scripts or other programs by entering command lines (e.g., a user selecting a macro in a Microsoft® Word document) to be executed by an Operating System 503 (e.g., Microsoft® Windows®). The Output Interface 513 enables, for example, the display of a front-end application (not shown in FIG. 5) of the Obfuscation and Malware Detection Engine (OMDE) 504. Output Interface 513 can include, for example, printers, audio devices (e.g., speakers), haptic output devices, and display devices. In some implementations, Output Interface 513 can activate an alarm upon a determination that an obfuscated malware was attempted to be executed at the Operating System 503. The signal to activate such alarm is generated by the OMDE 504.

The read-only memory (ROM) 511 stores static data and instructions that are used by the processor 501 and/or other modules of the compute device. The system memory (RAM) 519 can be a read-and-write memory device. Unlike read-only memory (ROM) 511, however, the system memory (RAM) 519 is a volatile read-and-write memory, such as a random access memory. The system memory (RAM) 519 can store some of the processor-executable instructions and data that the processor 501 uses at runtime. The compute device 500 can be connected, via Network Communication Interface 517 to a network of computers (for example, a local area network ("LAN"), a wide area network ("WAN"), or an Intranet, or a network of networks, for example the Internet).

The processor 501 can be a single processor or a multi-core processor in different implementations. In some instances, the processor 501 can be any suitable processor such as, for example, a general purpose processor, a field programmable gate array (FPGA), an application specific integrated circuit (ASIC) and/or other suitable hardware device. The processor 501 executes instructions of the Operating System 503 to control resources and processes executed at compute device 500. Likewise, the processor 501 can retrieve instructions to execute the processes implemented by the OMDE 504 from, for example, system memory (RAM) 519 and read-only memory (ROM) 511.

The OMDE 504 monitors calls or command lines for execution of scripts at the operating system level, and determines whether such calls or command lines are obfuscated. If such obfuscated calls or command lines are malware and/or part of a cyberattack, the OMDE 504 can generate an alarm or notification signal at compute device 500 or other compute device connected to compute device 500 via the Network Communication Interface 517. The OMDE 504 includes an OS Command Line Interface Agent 505, and Obfuscation Classifier Model 507, and a Malware Classifier Model 509.

The OS Command Line Interface Agent 505 monitors calls for the execution of scripts at the compute device 500 command line interface. The OS Command Line Interface Agent 505 is a computer program installed at compute device 500 (e.g., an endpoint) and configured to perform certain functions in conjunction with the Operating System 503. In some instances this OS Command Line Interface Agent 505 may monitor events (or set of events) published by Operating System 503 through publicly accessible Application Programming Interfaces (APIs). Examples of such events can include spawning of new processes, providing registry access and/or memory access and other suitable events published by Operating System 503. In some other instances the OS Command Line Interface Agent 505 can execute an interoperation of a command line or call to a script process by, for example, manipulating the command line process. For instance, if the OS Command Line Interface Agent 505 detects the processing of a script or command line call to process a script at the Operating System 503, the further processing of the script is limited based on an analysis to be conducted by the OMDE 504.

The OMDE 504 uses machine learning techniques, such as a Convolutional Neural Network (CNN) to generate, based on a set of features, a machine learning model to determine if an analyzed script is obfuscated. In some embodiments the machine learning model is generated based on a set of pre-defined features, while in other embodiments machine learning models generate a set of features based on labeled training data, while in still yet other embodiments, a set of pre-defined features may be set initially and a machine learning model determines a further set of features such that the machine learning model can be applied to a received script and determine if such a script is obfuscated. The models of the OMDE 504 are configured to reduce false positives and false negatives by training against known labeled (obfuscated and non-obfuscated) scripts.

Figure 6:
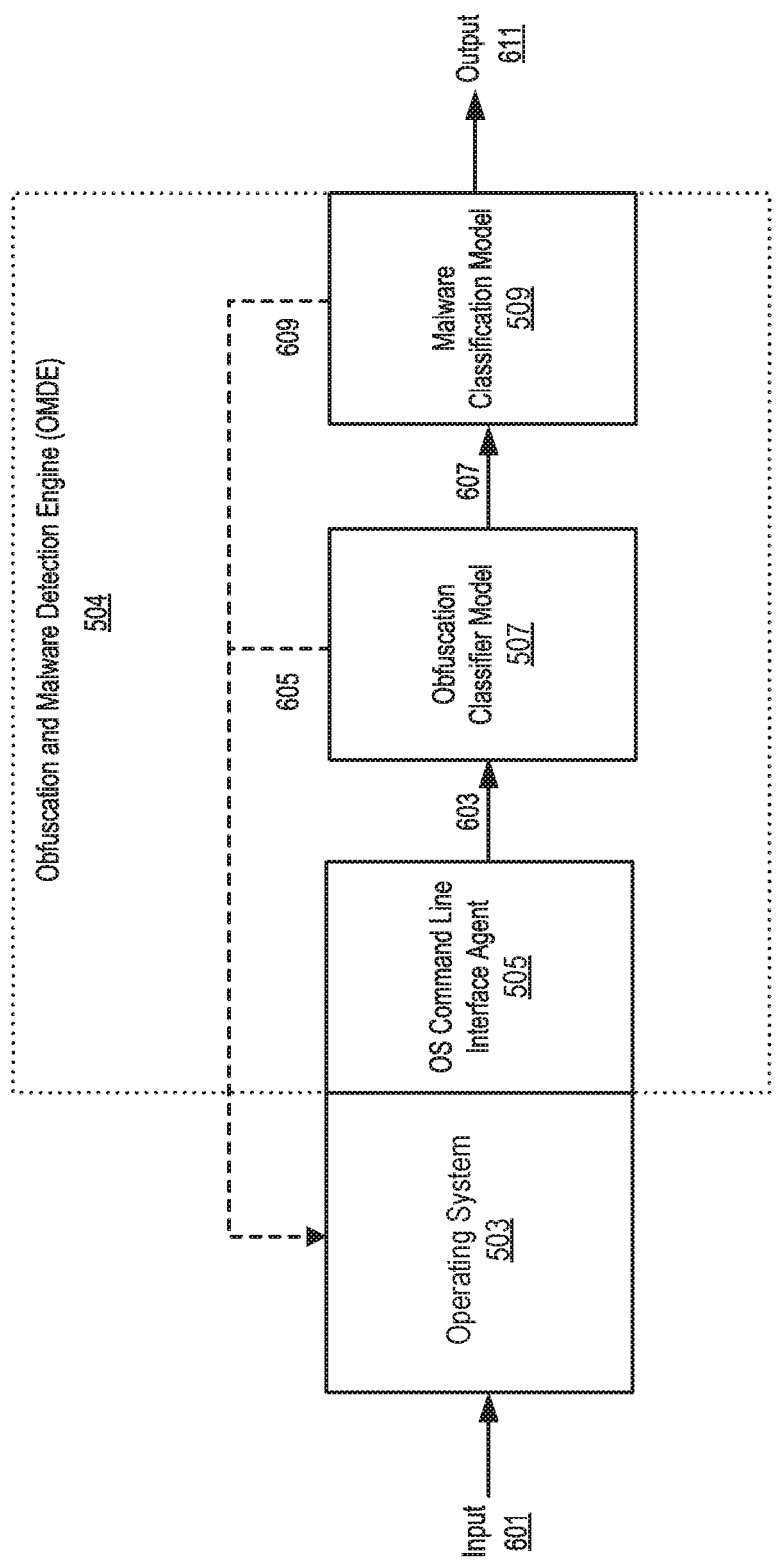
FIG. 6 is a block diagram illustrating an Obfuscation and malware detection engine (OMDE), according to an embodiment.

An example of a configuration of the OMDE 504 is discussed with reference to FIG. 6. An input, for example a command line or call to execute a script 601, is received at the Operating System 503. In some embodiments, the OS Command Line Interface Agent 505 can be implemented as a daemon or background process that monitors input 601 based on event signals produced by Operating System 503 and/or at predetermined time intervals. The OS Command Line Interface Agent 505 intercepts the execution of input 601 and sends a signal with an instance of the input 601 to the Obfuscation Classifier Model 507 via communication path 603.

The Obfuscation Classifier Model 507 determines whether the input 601 is likely a command line or call to run a malicious script, based on the obfuscation characteristics of input 601. The Obfuscation Classifier Model 507 can be implemented, for example, with a feature-based machine learning model such as a tree-based classification model. Examples of such tree-based classification models include random forest and gradient boosted trees. In random forest classification models, a collection (called "ensemble") of trees are used to make predictions. Each tree includes different sets of rules that are learned automatically from the training data and each tree is a little different from its peers. This difference allows a collection of non-correlated trees to jointly render a verdict that is far more accurate than if a single tree were consulted. All the other trees in the ensemble correct the mistakes of a single tree (wisdom of a crowd). A gradient boosted-tree has a similar ensemble approach, but instead of a parallel consultation with a collection of trees, training of the model includes deriving a sequence of trees with each successor tree in the sequence focusing on correcting the mistakes of its predecessor.

Tuning of the model refers to the process of maximizing a model's performance without overfitting or creating too high of a variance. Random forest models have the advantage that they are relatively easier to tune than models implemented as gradient-boosted trees. Once gradient-boosted trees are tuned, however, they can typically give better accuracy results than random forests.

In some implementations, the feature extractor may inspect a sizeable collection of samples of known obfuscated and known command lines to determine what features to extract for the implementation of a feature-based machine learning model. Such features can be extracted, for example, from command lines (obfuscated or not) of the samples. An example of a particular pattern representing a feature found in many obfuscated samples is now described below. This pattern uses environment variables to build up (in pieces) a command line, then concatenates all the contents of the environment variables into a single string and invokes a call on that string, an example of such pattern is provided at 303 in FIG. 3. An environment variable is a dynamic "object" on a computer, containing an editable value that can be used by one or more software programs in the Operating System (OS) 503. Environment variables help programs know in what directory to install files, where to store temporary files, and where to find user profile settings. They help shape the environment in which programs run on your computer.

Environmental variables are an advantageous feature to use in a machine learning model, because setting or changing environmental variables is used often by attackers to obfuscate inputs such as input 601. Recognizing a pattern such the one shown at 303 in FIG. 3 therefore provides three features—(1) the number of environment variables in the command-line (input 601, FIG. 6); (2) the use of the pipe character to pipe data into a secondary invocation (e.g., &&); and (3) the number of instances of the string cmd.exe or calls (for secondary or more invocations).

Some feature-based machine learning models therefore can define a selection of such well-designed features to elicit the presence of obfuscation. While a single feature by itself is often a weak signal for obfuscation and thus not very useful when used in isolation, the combined use of multiple features via a machine learning model like random forest or gradient-boosted trees can achieve acceptably high accuracy levels.

After the tuning of the Obfuscation Classifier Model 507 is complete, the Obfuscation Classifier Model 507 can be used with actual (non-training) data to make predictions. In some instances, when Obfuscation Classifier Model 507 determines that input 601 is likely a command line or call to run a malicious script, then Obfuscation Classifier Model 507 sends a signal via communication path 607 with an instance of the input 601 and/or a representation of obfuscation features (e.g., obfuscation variant as discussed with reference to FIG. 1) of input 601 to the Malware Classification Model 509. In some other instances, when Obfuscation Classifier Model 507 determines that input 601 is not likely a command line or call to run a malicious script, then Obfuscation Classifier Model 507 sends a signal to Operating System 503 via communication path 605 so that Operating System 503 executes the command line or call to execute a script received on input 601.

In some instances, when Malware Classification Model 509 receives an instance of the input 601 and/or a representation of obfuscation features of input 601, Malware Classification Model 509 determines whether to intercept (block) the execution of the input 601 by the Operating System 503 or allow the execution of the input 601 to proceed (not block). The Malware Classification Model 509 can classify the likelihood of maliciousness of the input 601 based on the signal received from the Obfuscation Classifier Model 507. In some implementations, the Malware Classification Model 509 can retrieve or inspect additional meta-information associated with the processing of the input 601, e.g., the source of the script or command line; whether the script or command line resulted from the processing of code received by compute device (e.g., the compute device 500 shown in FIG. 5) via email, or other suitable source; code signature; or other suitable type of meta-information associated with input 601. In other words, the Malware Classification Model 509 can classify the likelihood of maliciousness of the input 601 based on obfuscation without using additional meta-information, and then perform further processing to retrieve or inspect additional meta-information to update the classification. In at least one implementation, the further processing of additional meta-information can be performed when the Malware Classification Model 509 classifies the input 601 as malicious (or when a threshold is exceed by the classified likelihood of maliciousness) and not when the Malware Classification Model 509 classifies the input 601 as benign (or when a threshold is not exceed by the classified likelihood of maliciousness). In some instances, when the Malware Classification Model 509 determines that the input 601 is malicious, an output 611 with an alert signal can be generated and provided to an user of compute device 500, a security administrator, or a security information and event manager (SIEM), or an automated endpoint security management system connected to compute device 500 via Network Communication Interface 517 discussed with reference to FIG. 5. In such case, the Malware Classification Model 509 can effectively intercept the execution of the input 601. In some other instances, when the Malware Classification Model 509 determines that the input 601 is not malicious then, Malware Classification Model 509 sends a signal to the Operating System 503 via communication path 609. Thereafter, Operating System 503 executes the command line or call to execute a script received on input 601; otherwise the input 601 is not executed by the Operating System 503.

In some implementations, the Malware Classification Model 509 can include a neural network machine learning model. Neural networks are a type of machine learning logic that includes small processing units called neurons arranged in a network and implemented with hardware and/or software. Specifically, Malware Classification Model 509 can, in some implementations, include a Convolutional Neural Network (CNN) not shown in FIG. 5.

While neural networks can be used with feature data, neural networks can advantageously work with raw data (converted into numeric form)—without performing any separate feature design or extraction. A challenge to this approach is how to convert text data into numeric form. Several approaches exist and the drawbacks or advantages of each approach are discussed below. The unit of text to use can be character/letter based or word-based. When dealing with obfuscated text and the possibilities for generating syntactically correct but otherwise nonsense words of text, a word-based approach may not be the most efficient. Most of the words will not be in any dictionary and an extremely large number of words can be generated that are unlikely to repeat—making numeric representations impractical. A letter-based approach on the other hand results in a more-manageable finite set of letters/characters that can easily be encoded with a finite number of numeric representations.

Three choices for a numeric representation can be used— (1) a unique numeric ID can be assigned to each character, (2) a "discrete" one hot representation can be used; or (3) "continuous" vectors can be used. Using a numeric ID can misguide the machine learning model. For example, if "a" is 1 and "b" is 2, the model assumes that "a" and "b" are somehow more similar to each than say "t" which has a representation of 20—when such is not the case in the English language. In a discrete 1-hot representation each letter is represented with a 256 dimension vector where each component of the vector represents a single letter (say by its ASCII encoding) is a more useful way of representing letters. Such a vector would then have only one of its 256 components set to 1 with all other vector components set to 0. This is why this is called a 1-hot encoding. The drawbacks with this approach are twofold—it greatly increases the amount of data used in later computations and it does not convey any relationship information between the letters, i.e., each letter is considered as an independent axis orthogonal to all other letters when such is not the case in any language. The third approach is to use a dense vector of typically a few dimensions, which is a continuous real-valued vector. Not only is this a numeric format that is compact, but it also can convey semantic information about the relationships between the various letters also referred herein as semantic relationships. Deriving such continuous vectors can be done by tacking on an input "embedding" layer to the convolutional neural network (here embedding refers to the compact real-valued vector). The continuous vectors can be implemented as a multidimensional vector data structure that includes numerical values representing a command line and semantic relationships between characters included in the command line. As the model trains on the data, the model learns "embeddings" that are meaningful for the type of data (obfuscated command lines) used in training. The output of the embedding layer is then fed to a CNN implemented in Malware Classification Model 509.

Figure 7:
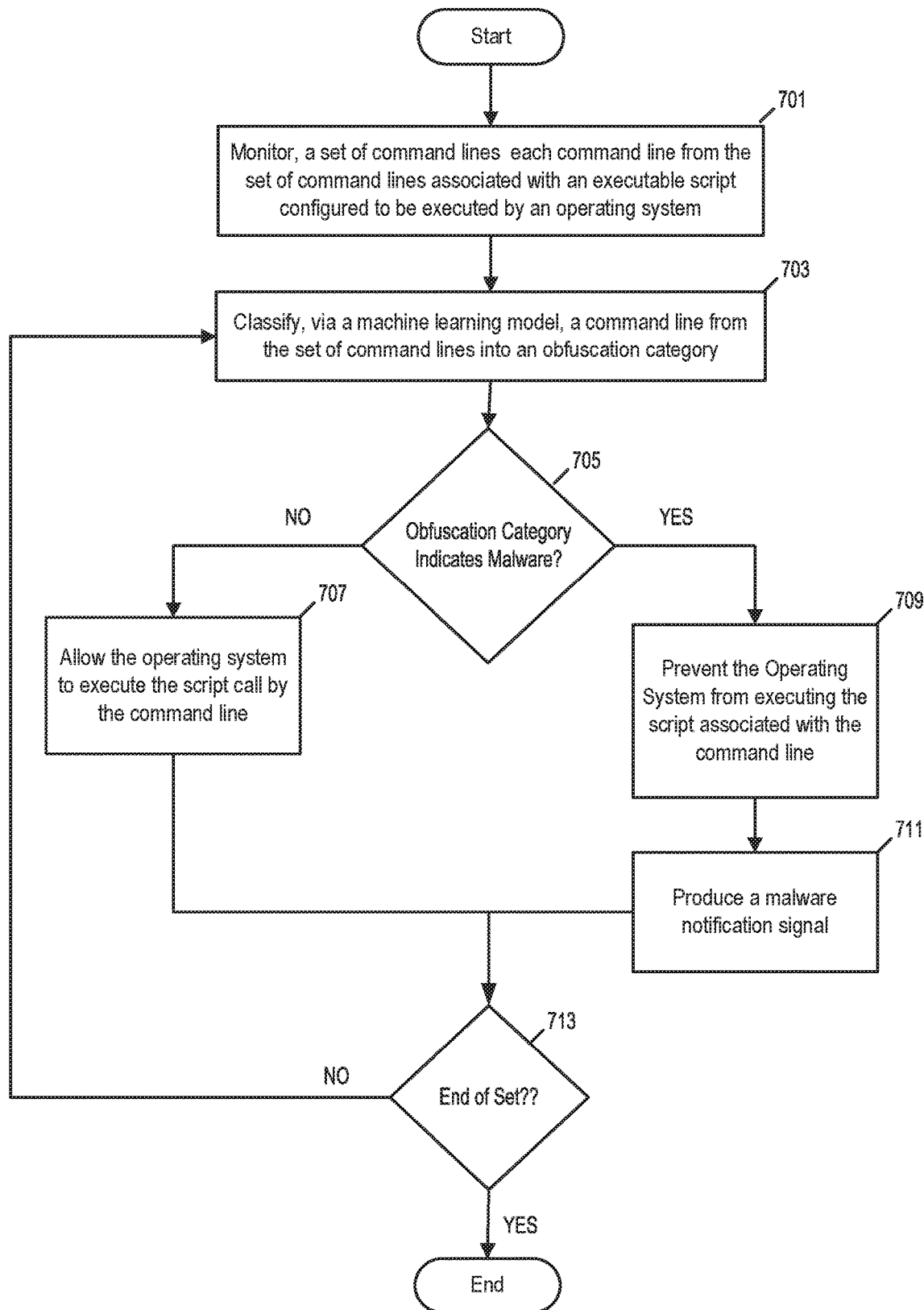
FIG. 7 is an example of a flowchart illustrating a process executed by the OMDE, according to an embodiment.

A flowchart describing a process executed by the OMDE is discussed with reference to FIG. 7. The OMD via, for example, OS Command Line Interface Agent 505 (FIG. 5) monitors at 701 a set of command lines. Each command line from the set of command lines can be a called to execute a script or otherwise be associated with an executable script configured to be executed by the Operating System 503 (FIG. 5). Thereafter, the OMDE classifies at 703 via a machine learning model, e.g., Obfuscation Classification Model 507 and/or Malware Classification Model 509 (FIG. 5), a command line into an obfuscation category.

In some instances, when the obfuscation category indicates at 705 that the command line is benign, then the OMDE allows the operating system to execute the script that is called by the command line as shown at 707. Thereafter, the OMDE determines whether all of the command lines in the set have been exhausted as shown at 713, i.e., the set is empty. In such a case, the flow ends; otherwise, it continues processing command lines.

In some other instances, when the obfuscation category indicates at 705 that the command line is not benign, that is, the command line is configured to make a call to execute malware, the OMDE prevents the operating system from executing the script called by the command line at 709 by intercepting (or blocking) the command line before it is received and executed by the operating system. The OMDE also generates a notification signal or alert to notify to a security administrator, or an automated endpoint security management system that a call to execute malware in furtherance of a cyberattack has been detected and mitigated as shown at 711. As previously discussed then, the OMDE determines whether all of the command lines in the set have been exhausted as shown at 713 i.e., the set is empty. In such a case, the flow ends and otherwise it continues processing command lines.

As described above, the OMDE detects obfuscated command lines that can be used as a proxy to execute malicious scripts or malware. Using machine learning models, the OMDE implements a highly accurate mechanism to detect such command lines without deriving or maintaining the complex IF-THEN rules and regular expressions that have been previously used in the cybersecurity field.

Note that although the above discussion included references to monitoring command lines, classifying command lines into an obfuscation category, and preventing and/or allowing the execution of the command line based on the obfuscation category, it should be understood that a similar process can be performed on the executable scripts called by the command lines. Such a similar process can be performed on executable scripts whether or not the executable scripts are called by command lines or by some other process that does not involve command lines. Thus, it is contemplated that the processes described herein of monitoring, classifying and preventing and/or allowing execution can relate to command lines, executable scripts or a combination of both.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, solid state storage devices, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The invention claimed is:

1. A non-transitory computer-readable medium comprising code which, when executed by a processor, cause the processor to:
   monitor, via the processor, a set of command lines received via a command line interface, each command line from the set of command lines associated with an executable script configured to be executed by an operating system;
   convert a command line from the set of command lines into a numerical form in a vector data structure;
   classify, after converting the command line and via a machine learning model, the command line into an obfuscation category; and
   prevent the operating system from executing the command line when the obfuscation category indicates that the command line is part of a cybersecurity attack.

2. The non-transitory computer-readable medium of claim 1, wherein the vector data structure includes a numerical representation of each character included in the command line and semantic relationships between characters included in the command line.

3. The non-transitory computer-readable medium of claim 1, wherein vector data structure is a multidimensional vector data structure that is produced via an embedding layer implemented in the machine learning module and that includes numerical values representing the command line and semantic relationships between characters included in the command line.

4. The non-transitory computer-readable medium of claim 1, further comprising code which, when executed by the processor, further causes the processor to:
   train the machine learning model to classify operating system command lines into the obfuscation category.

5. The non-transitory computer-readable medium of claim 1, further comprising code which, when executed by the processor, causes the processor to:
   generate a notification signal indicative of a presence of a malware when the obfuscation category indicates that the command line is part of a cybersecurity attack; and
   send a notification signal indicative of the presence of the malware to a security management system via a network communication interface, when the obfuscation category indicates that the command line is part of the cybersecurity attack.

6. The non-transitory computer-readable medium of claim 1, wherein the machine learning model is an unsupervised machine learning model.

7. The non-transitory computer-readable medium of claim 1, wherein the machine learning model is a supervised machine learning model.

8. The non-transitory computer-readable medium of claim 1, wherein the machine learning model is a convolutional neural network.

9. A method, comprising:
   detecting a call configured to be executed by an operating system;
   preventing the call from being executed;
   converting the call into a numerical form in a vector data structure;
   classifying, after converting the call and via a machine learning model, the call into an obfuscation category; and
   preventing the operating system from executing of the call when the obfuscation category indicates that the call is part of a cybersecurity attack.

10. The method of claim 9, further comprising:
    training the machine learning model to classify operating system calls into an obfuscation category; and
    executing an unsupervised machine learning technique such that the machine learning model learns to identify obfuscated data patterns included in the call.

11. The method of claim 9, further comprising:
    training a machine learning model to classify operating system calls into an obfuscation category; and
    executing a supervised machine learning technique such that the machine learning model learns to identify obfuscated data patterns included in the call.

12. The method of claim 9, further comprising:
    monitoring the call received to be executed by the operating system based on a set of events tracked from the operating system.

13. The method of claim 9, wherein the machine learning model is a convolutional neural network.

14. The method of claim 9, wherein the machine learning model is a random forest machine learning model.

15. The method of claim 9, wherein the machine learning model is a gradient boosted tree machine learning model.

16. The method of claim 9, wherein the call corresponds to an invocation to execute an operating system script program.

17. The method of claim 9, wherein the machine learning model reduces a number of false positives and a number of false negative classifications associated with the cybersecurity attack.

18. A non-transitory computer-readable medium comprising code which, when executed by a processor, cause the processor to:

interrupt, via the processor, a command line configured to be executed by an operating system;

extract at least one string pattern from the command line, the string pattern having vector data structure;

classify the at least one string pattern, via a machine learning model trained to classify the at least one string pattern into an obfuscation category; and prevent the operating system execution of the command line when the obfuscation category indicates that the at least one string pattern is part of a cybersecurity attack.

19. The non-transitory computer-readable medium of claim 18, further comprising code which, when executed by the processor, further causes the processor to:

train the machine learning model based on a supervised machine learning technique and based on a set of obfuscated command line patterns.

20. The non-transitory computer-readable medium of claim 18, further comprising code which, when executed by the processor, further causes the processor to:

train the machine learning model based on a supervised learning technique and based on a set of obfuscated command line patterns, the set of obfuscated command line patterns includes obfuscated command line patterns indicative of a set of operating system environmental variables, obfuscated commands to pipe or redirect data to a process of the operating system, and obfuscated invocations to an operating command-line interface.

* * * * *